United States Patent
Joshi et al.

(10) Patent No.: US 9,081,529 B1
(45) Date of Patent: Jul. 14, 2015

(54) GENERATION OF ELECTRONIC BOOKS

(75) Inventors: Lokesh Joshi, Mercer Island, WA (US); Eric A. Menninga, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 251 days.

(21) Appl. No.: 13/530,616

(22) Filed: Jun. 22, 2012

(51) Int. Cl.
*G06F 3/12* (2006.01)
*G06F 17/21* (2006.01)

(52) U.S. Cl.
CPC ............ *G06F 3/1239* (2013.01); *G06F 3/1225* (2013.01); *G06F 17/211* (2013.01); *G06F 17/214* (2013.01)

(58) Field of Classification Search
None
See application file for complete search history.

(56) References Cited

U.S. PATENT DOCUMENTS

| | | | | |
|---|---|---|---|---|
| 6,065,008 | A * | 5/2000 | Simon et al. ........................... | 1/1 |
| 7,262,869 | B2 * | 8/2007 | Reese et al. .................. | 358/1.11 |
| 2005/0275656 | A1 * | 12/2005 | Corbin et al. ................. | 345/467 |
| 2008/0028304 | A1 * | 1/2008 | Levantovsky et al. ........ | 715/269 |
| 2009/0303241 | A1 * | 12/2009 | Priyadarshi et al. .......... | 345/471 |
| 2010/0131518 | A1 * | 5/2010 | Elteto et al. ................... | 707/752 |
| 2010/0257354 | A1 * | 10/2010 | Johnston et al. .............. | 713/153 |
| 2011/0075196 | A1 * | 3/2011 | Cogan ......................... | 358/1.15 |

* cited by examiner

*Primary Examiner* — Xiao Wu
*Assistant Examiner* — Steven Elbinger
(74) *Attorney, Agent, or Firm* — Sutherland Asbill & Brennan LLP (57) ABSTRACT

Described herein are systems and methods for modifying electronic books ("eBooks"). A server processes eBook data to determine portions of one or more source fonts comprising various glyphs used in presenting the eBook. An embedded font is generated which includes those portions of the one or more fonts which are used in the particular eBook data. Because the unused portions of the one or more fonts are omitted, the overall size of the embedded fonts may be less than those of the source fonts. A custom character map may be generated as part of the embedded font which provides for increased document security.

20 Claims, 10 Drawing Sheets

GENERATION OF ELECTRONIC BOOKS

BACKGROUND

Electronic books ("eBooks") provide exciting and interesting ways to distribute information to users without using traditional print on paper. The eBooks comprise text which may be represented in a variety of different fonts. These different fonts may be selected for artistic or functional reasons during the preparation of the eBook, such as by a publisher. These fonts contain data to present particular glyphs to the users via a display. However, as eBooks have expanded to include global audiences and an ever-increasing array of glyphs, the size of an eBook has increased in size. Furthermore, publishers may have concerns over security of fonts used in eBooks.

Certain implementations will now be described more fully below with reference to the accompanying drawings, in which various implementations and/or aspects are shown. However, various aspects may be implemented in many different forms and should not be construed as limited to the implementations set forth herein. Like numbers refer to like elements throughout.

DETAILED DESCRIPTION

Electronic books ("eBooks") provide exciting and interesting ways to distribute information to users without using traditional printing on paper. The eBooks comprise text which may be represented in a variety of different fonts on a variety of devices. These devices may include tablet computers, laptops, smartphones, desktop computers, entertainment systems, game consoles, televisions, and so forth.

Traditional eBooks have utilized fonts available upon the device presenting the eBook. However, publishers, authors, designers, and others may design eBooks using particular fonts or glyphs for a variety of reasons ranging from aesthetic to functional. Additionally, eBooks which utilize fonts with very large character sets may be very large. For example, an eBook which presently uses a single kanji glyph may be distributed with a very large set of all available kanji glyphs, even though these are unused.

Designers of fonts, publishers, and other interested parties may also be concerned about misappropriation of fonts or the glyphs described therein. For example, a publisher may be reluctant to provide an entire font with all glyphs for a specialized typeface due to concerns about misappropriation. Furthermore, an author, a publisher, or other party may be concerned about misappropriation of textual content. For example, a user copying a portion of the eBook for other use.

Described herein are systems and methods for generating modified eBook data suitable for distribution to devices. The modified eBooks may be configured with embedded fonts which are representative of the characters and associated glyphs as used in the text of the eBook. Unused characters are omitted. As a result, the modified eBook with embedded fonts requires less storage space than an unmodified eBook.

Security of the font as embedded is improved because the embedded font may be less than the complete set of characters as provided for in a source font. Security for the font as well as the content on the eBook may also be improved by generating an embedded character map. Traditional systems use a standardized coding such as Unicode to refer to a particular character map which refers to a specific glyph. As described herein, the embedded character map may be modified to be specific to the user, the device, and so forth. Thus, as described herein, modified eBooks may be provided which are smaller in size and more secure.

Illustrative System

Figure 1:
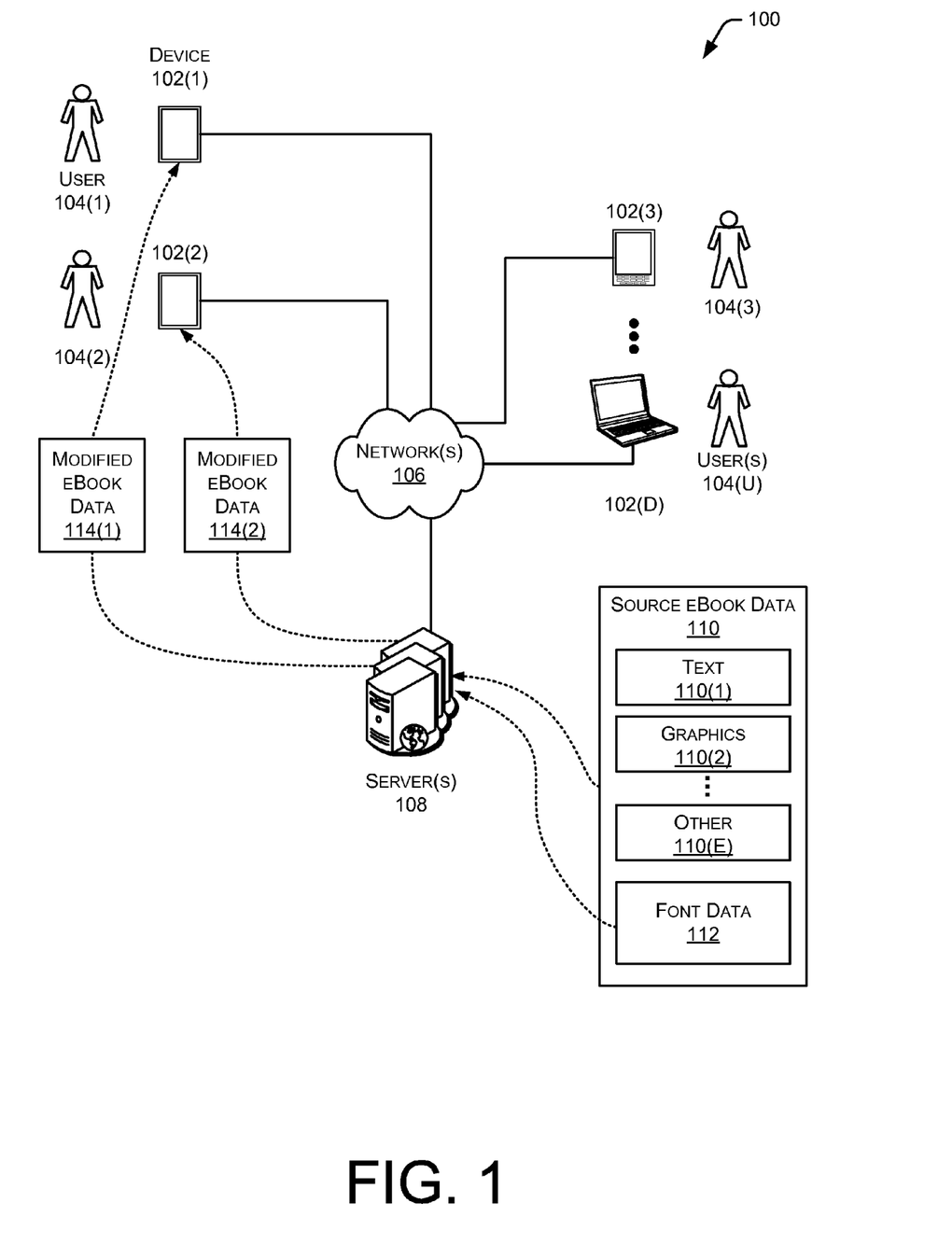
FIG. 1 illustrates a system for generating modified eBook data in accordance with an embodiment of the disclosure.

FIG. 1 illustrates a system 100 for generating modified eBook data. One or more devices 102(1), 102(2), 102(3), . . . 102(D) may be used by one or more users 104(1), 104(2), 104(3), . . . 104(U). As used herein, letters enclosed by parenthesis such as "(D)" or "(U)" indicate an integer having a value greater than zero. The devices 102 may include smartphones, laptop computers, desktop computers, tablet computers, televisions, set-top boxes, game consoles, in-vehicle entertainment systems, and so forth. The devices 102 comprise one or more processors, one or more memories, one or more displays, and one or more input/output ("I/O") interfaces. In some implementations, the one or more displays may comprise reflective displays. Reflective displays include, but are not limited to, electrophoretic displays, interferometric displays, cholesteric displays, and so forth. The devices 102 may couple via the I/O interfaces to a network 106. The network 106 may comprise one or more private networks, public networks such as the Internet, or a combination of both private and public networks configured to transfer data between two or more devices.

Coupled to the network 106 is a server 108. The server is configured to access source eBook data 110. For example, a publisher or author may transfer the source eBook data 110 to memory accessible by the server 108. The source eBook data 110 may comprise text 110(1), graphics 110(2), and other information 110(E). The text 110(1) may comprise text for presentation as well as designations for particular fonts for use in rendering the text on the display of the device 102. In some implementations, the text 110(1) may be expressed as a markup language including references to the particular fonts for use in rendering the text on the display of the device 102. In another implementation, the other information 110(E) may include the font designations.

The source eBook data 110 references font data 112. This font data 112 describes specifications of the font, glyphs, and so forth. Font data is discussed below in more detail with regards to FIG. 2.

The server 108 is configured to access the source eBook data 110 and the font data 112, and generate modified eBook data 114(1) and 114(2). This modified eBook data 114 may be configured, using the techniques described below, to use less storage space than the unmodified source eBook data and corresponding font data. The modified eBook data 114 may also be configured to be more secure through obfuscation of character maps and in some implementations by having an embedded font which contains less than a full set of data found in the source font data 112. The modified eBook data 114 may be provided via the network 106 to the devices 102. The server 108 is discussed in more detail below with regard to FIG. 4.

Figure 2:
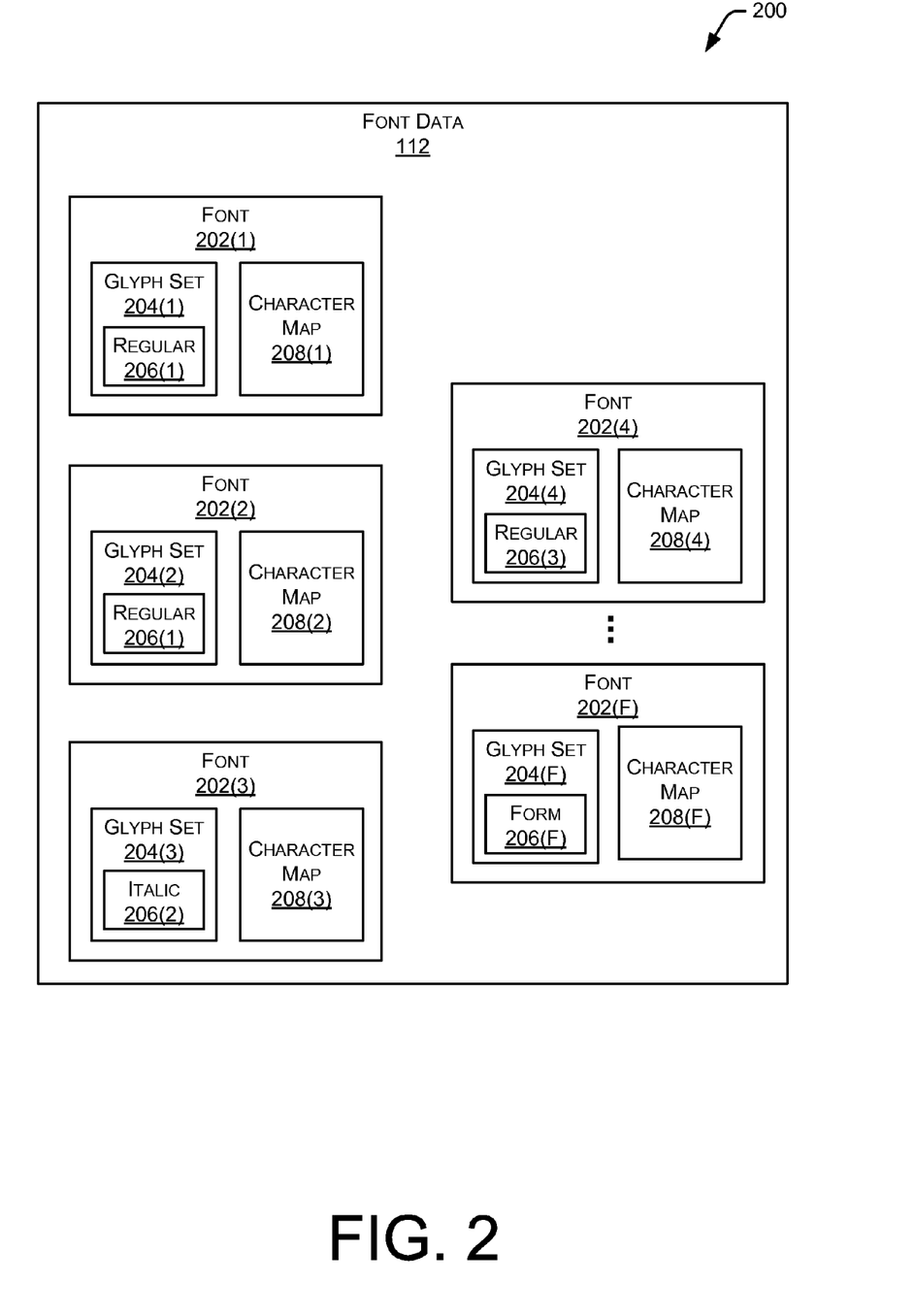
FIG. 2 illustrates a block diagram of font data in accordance with an embodiment of the disclosure.

FIG. 2 illustrates a block diagram 200 of the font data 112. The font data 112 for an eBook may be for one or more fonts 202. For example, the eBook may contain chapter headings using a first font 202(1) and body text which uses a regular font 202(2) and an italic font 202(3).

Each font 202 comprises a glyph set 204. These glyph sets 204 describe the shape and formation associated with particular characters. The glyph sets may be described using techniques such as outline or vector, raster, stroke, and so forth. For example, the glyphs in a font 202 may be described in raster form as a particular matrix or bitmap. The glyphs in a font 202 which is described as an outline may include one or more formulae or other instructions which when processed form the character. Different styles or forms 206 of the glyph sets 204 may be provided. For example, the font 202(1) may have a glyph set 204(1) which includes one of a regular 206(1), italic 206(2), or boldface 206(3).

The font 202 may vary in size from a very small number of characters and associated glyphs to thousands of entries. For example, the Kana Supplement in Unicode comprises two glyphs, while the Kanji Unicode contains thousands of characters and associated glyphs.

Each font 202 may also include a character map 208. The character map 208 is configured to provide an association between a particular character code and a particular glyph for a character. The character map 208 is discussed below in more detail with regard to FIG. 3.

The source eBook data 110 may access this font data 112 during the presentation of one or more fonts 202 on a display of the device 102. For example, as shown here, the font data 112 for a particular eBook may include fonts 202(1), 202(3), 202(4) . . . , 202(F). Each of these fonts 202 and their corresponding glyph sets 204 may be used to present information to the user 104 via the display of the device 102.

Figure 3:
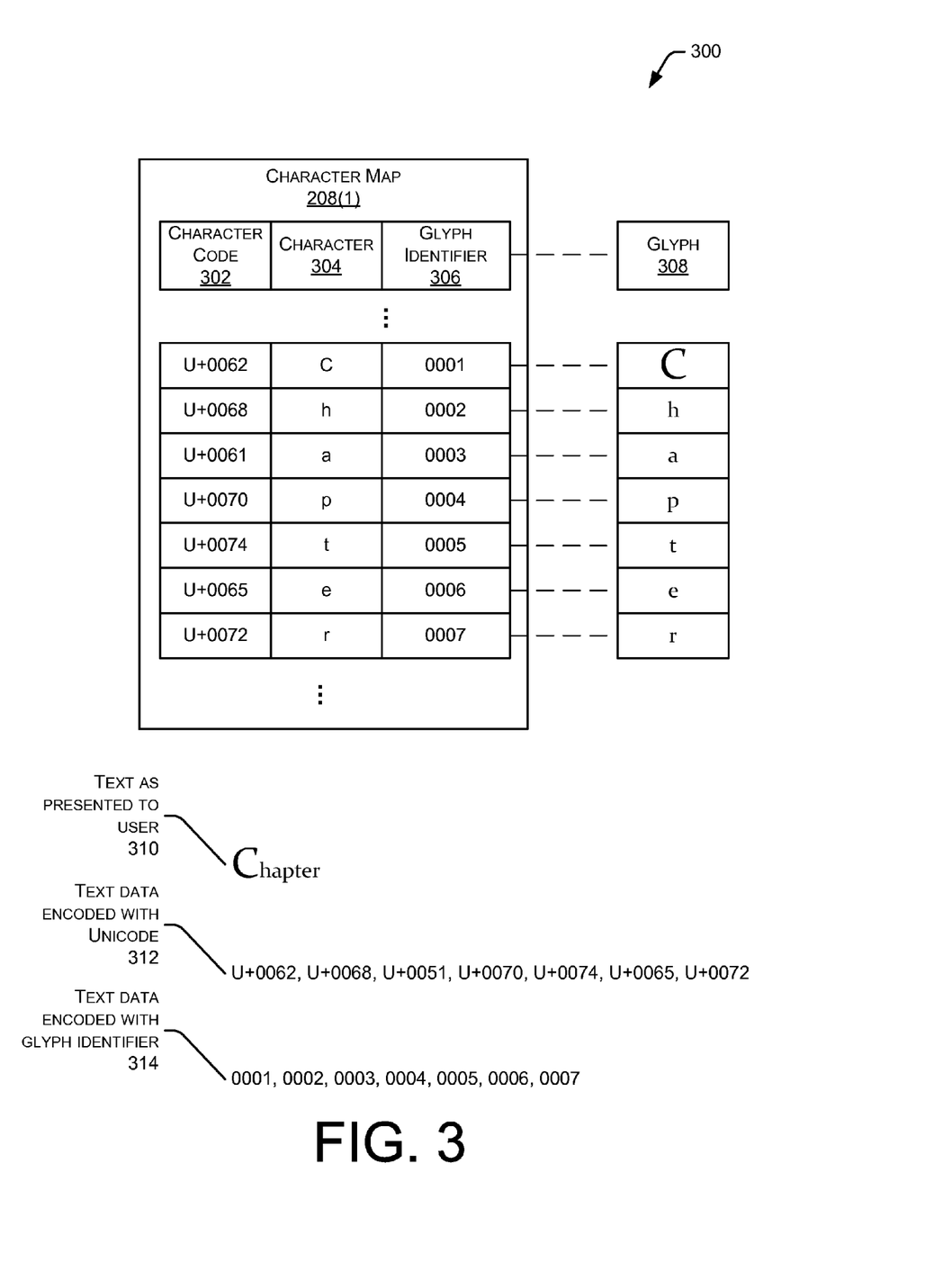
FIG. 3 illustrates a block diagram of a character map in accordance with an embodiment of the disclosure.

FIG. 3 illustrates a block diagram 300 of a character map 208. In this figure, a portion of the character map 208(1) for the font 202(1) is illustrated. The character map 208 is depicted as a table, but other data structures may be used in other implementations.

The character map 208(1) associates a character code 302 with a particular character 304. The character code 302 may be defined in a standard or standards such as those promulgated by the Unicode Consortium of Mountain View, Calif. In this example, the character codes 302 Unicode are depicted with the prefix "U+" in this disclosure. The character 304 associated with the character code 302 is also shown. For example, the character code 302 of U+0062 represents a capital letter "C" in the Roman alphabet. The character 304 is associated with a particular glyph identifier 306. The glyph identifier in turn refers to a particular glyph 308, which in some implementations may be stored in another location. Continuing the example here, the U+0062 character code 302 is associated with the glyph identifier 306 of 0001, which is the glyph 308 of a particularly shaped capital letter "C".

A given character 304 may be represented by multiple glyphs 308 as expressed in different fonts 202. For example, the glyph 308 which is rendered for the character of "C" in font 202(1) may have a different form from that rendered by font 202(3).

Below the character map 208(1) in this illustration are three lines of information. A first line depicts text as it is presented to the user 310 on the display of the device 102. This is a representation consistent with the intention of the publisher, designer, or author during the typesetting and layout of the eBook and the creation of the source eBook data 110.

A second line depicts the text data as encoded with the Unicode 312 coding scheme. For example, the representative characters spell out "Chapter" with a capital "C" and then the remaining letters as lowercase letters.

A third line depicts the text data encoded with the glyph identifier 314. In some implementations, the modified eBook data 114 may include the text configured to use the glyph identifier 306 rather than the character code 302. This configuration may serve to obfuscate the contents of the eBook such that misappropriation of the material therein, such as the fonts 202 or the content, is rendered more difficult. In some implementations, such as those described below with regard to FIG. 8, the character map as embedded within the modified eBook data 114 may be varied so that even for the same source text 110(1) and font data 112, the resulting embedded character map 208 differs between devices, users, and so forth. Furthermore, the embedded character map 208 differs from a source character map such as the character map 208 of the source font data 112.

Figure 4:
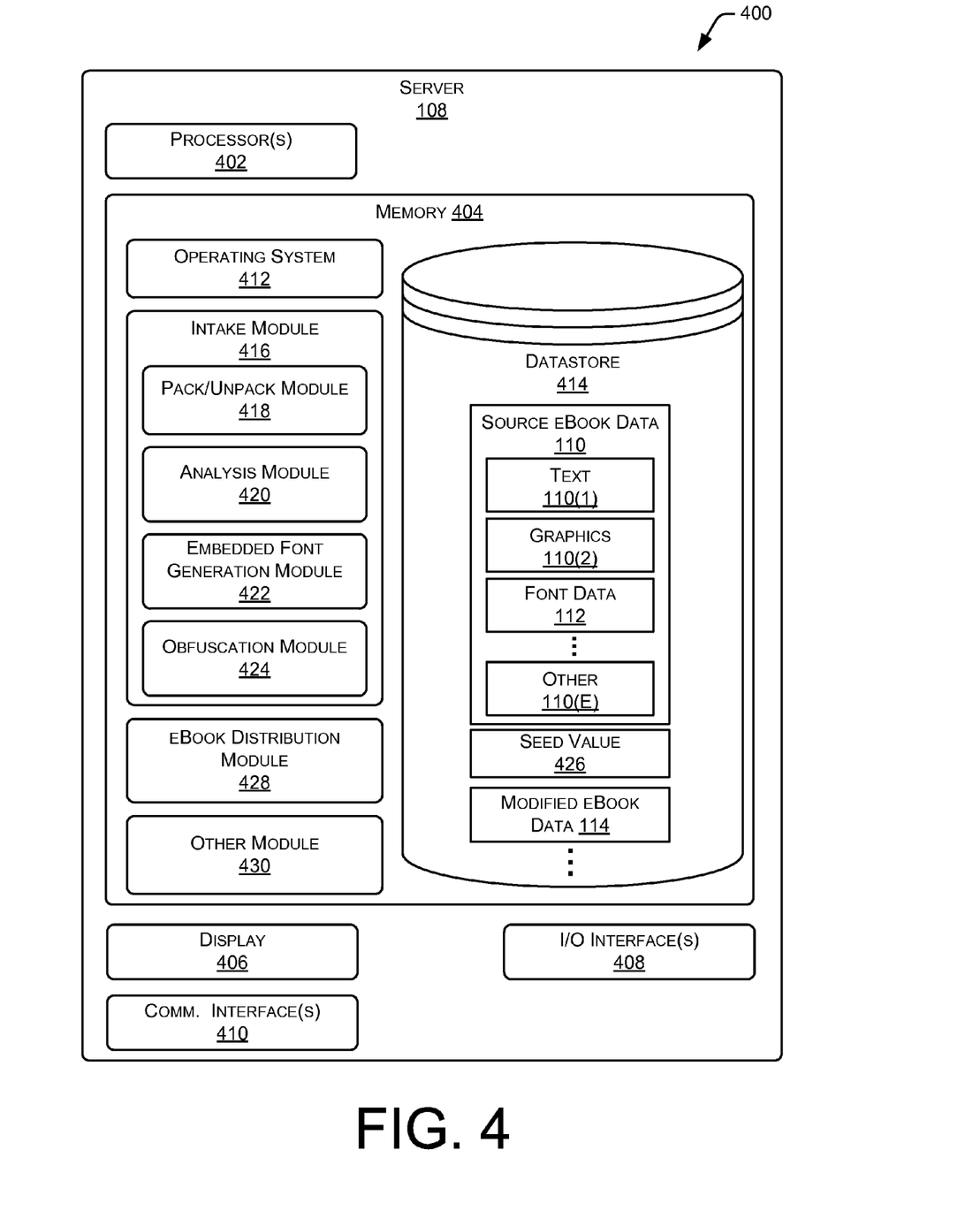
FIG. 4 illustrates a block diagram of a server configured to generate the modified eBook data in accordance with an embodiment of the disclosure.

FIG. 4 illustrates a block diagram 400 of the server 108 configured to generate the modified eBook data 114. The server 108 may comprise one or more processors 402, one or more memories 404, one or more displays 406, one or more input/output ("I/O") interfaces 408, and one or more communication interfaces 410.

The processor 402 may comprise one or more cores and is configured to access and execute at least in part instructions stored in the one or more memories 404. The one or more memories 404 comprise one or more computer-readable storage media ("CRSM"). The one or more memories 404 may include, but are not limited to, random access memory ("RAM"), flash RAM, magnetic media, optical media, and so forth. The one or more memories 404 may be volatile in that information is retained while providing power or non-volatile in that information is retained without providing power.

The display 406 is configured to present visual information to the user 104. The one or more I/O interfaces 408 may also be provided in the server 108. These I/O interfaces 408 allow for coupling devices such as keyboards, external memories, and so forth to the server 108.

The one or more communication interfaces 410 provide for the transfer of data between the server 108 and another device directly such as in a peer-to-peer fashion, via the network 106, or both. The communication interfaces 410 may include, but are not limited to, wired local area networks ("LANs"), wireless local area networks ("WLANs"), wireless wide area networks ("WWANs"), and so forth.

The one or more memories 404 may store code or program instructions for execution by the processor 402 to perform certain actions or functions. These instructions may include an operating system 412 configured to manage hardware resources such as the I/O interfaces 408 and provide various services to applications executing on the processor 402. The one or more memories 404 may also store adatastore 414 containing information about the operating system, configuration files, and so forth.

An intake module 416 is stored in the one or more memories 404. The intake module 416 is configured to process the source eBook data 110 and the source font data 112 to generate the modified eBook data 114. The intake module 416 may comprise a pack/unpack module 418, an analysis module 420, an embedded font generation module 422, and an obfuscation module 424.

The pack/unpack module 418 is configured to pack and unpack the eBook data. During unpacking, the pack/unpack module 418 accesses and prepares the source eBook data 110 for further processing. The unpacking may comprise decompressing, retrieving the font data 112 associated with the text 110(1), deconstructing elements of a container object, and so forth. During packing, the pack/unpack module 418 assembles the processed data such as embedded fonts and embedded character maps and prepares them for distribution. Packing may comprise assembling the processed data into a single container object, applying data compression, and so forth.

The analysis module 420 is configured to analyze the source eBook data 110. This analysis may include determining a frequency of occurrence of characters, glyphs, and other elements in the text 110(1). For example, the analysis may determine that for font 202(3) no boldfaced glyphs are used and that only a single glyph from the font 202(4) is used. The analysis module 420 may thus be used to help identify which glyphs are used in a particular set of source eBook data 110. This information may then be used by the embedded font generation module 422.

The embedded font generation module 422 is configured to generate an embedded font for inclusion in the modified eBook data 114. The embedded font generation module 422 may utilize the analysis provided by the analysis module 420 to omit glyphs and characters which are present in the source font data 112 but are not used by the source eBook data 110. Continuing the example, the embedded font generation module 422 may generate an embedded font based on the font 202(4) which includes the single glyph used in the eBook. By generating the embedded font with those glyphs that are used, additional storage space is not needed to store glyphs in the source font 202(4) which are not used. This also improves security of the typeface from misappropriation because the complete source font 202(4) need not be provided to the device 102.

The embedded font generation module 422 may also be configured to generate embedded character maps associated with the embedded fonts. These embedded character maps are discussed below with regard to FIG. 8.

The obfuscation module 424 may be configured to modify the embedded character maps such that they vary between eBooks, devices, users, and so forth. By applying a transform or other function to the relationship or index between the character code 302 and the glyph identifier 306, the glyph 308, or both, the contents of the eBook as well as the font 202 may be further secured. This obfuscation process may use a seed value 426. This seed value 426 may be stored in the datastore 414. The seed value 426 may be associated with a particular eBook, device 102, user 104, or a combination thereof. The seed value 426 may be based on a particular value such as a user identifier, be randomly or pseudo-randomly generated, and so forth. In some implementations, additional characters and glyphs not otherwise present in the corresponding source font 202 may be included in the embedded character map to further obfuscate the content.

An eBook distribution module 428 is also shown in the memory 404. The eBook distribution module 428 may be configured to provide, or otherwise make, the modified eBook data 114 accessible to the devices 102. For example, the eBook distribution module 428 may be configured to distribute the modified eBook data 114(1) to the device 102(1) via the network 106.

Other modules 430 may also be stored in the memory 404. For example, a publisher user interface module may be configured to provide a user interface such that publishers, authors, or other parties may upload the source eBook data 110 to the server 108.

Figure 5:
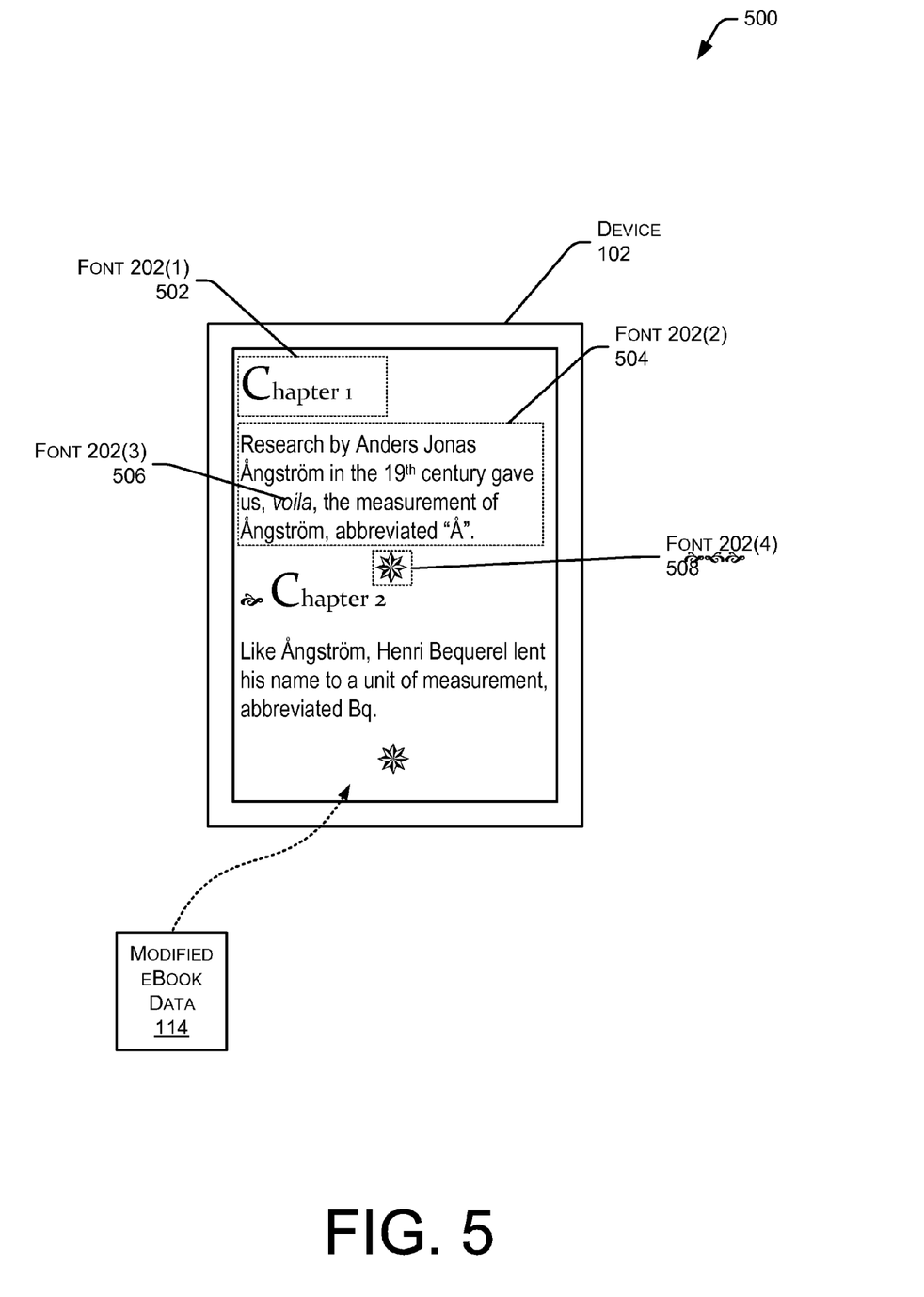
FIG. 5 illustrates a user interface presenting a portion of an eBook in accordance with an embodiment of the disclosure.

FIG. 5 illustrates a user interface 500 presenting a portion of an eBook. In this illustration, the device 102 is shown with a display presenting at least a portion of the modified eBook data 114 as provided for originally in the source eBook data 110. In this example, for the sake of illustration and not by way of limitation, three different fonts 202(1)-202(4) are depicted.

Chapter headings in this example book are formatted to use the font 202(1) as shown at 502. Body text in the chapters is shown using the font 202(2) as shown at 504. As shown at 506, the font 202(3) with the italic form is used. The fourth font 202(4) is used for a glyph of an eight pointed star as shown at 508 to provide a visual break between the chapters. The font 202(4) may include this and other dingbats or printer's ornaments.

Continuing with this illustration, assume that the book comprises only chapters one and two. The font 202(1) as shown at 502 is used in this particular eBook only for the chapter headings. The chapter headings comprise the text of "Chapter" and the numbers "1" and "2" in this font 202(1). Traditionally, the entire font 202(1) would be provided to the device 102 for use in rendering the text on the display. However, as described with regard to FIG. 6, this results in using significant resources, such as memory for storage or data transmission capacity, for data that will not be used in presenting data on the display. By using the techniques described herein, the intake module 416 may be able to reduce the overall size of the modified eBook data 114 relative to the source eBook data 110, and improve security of the data therein.

Figure 6:
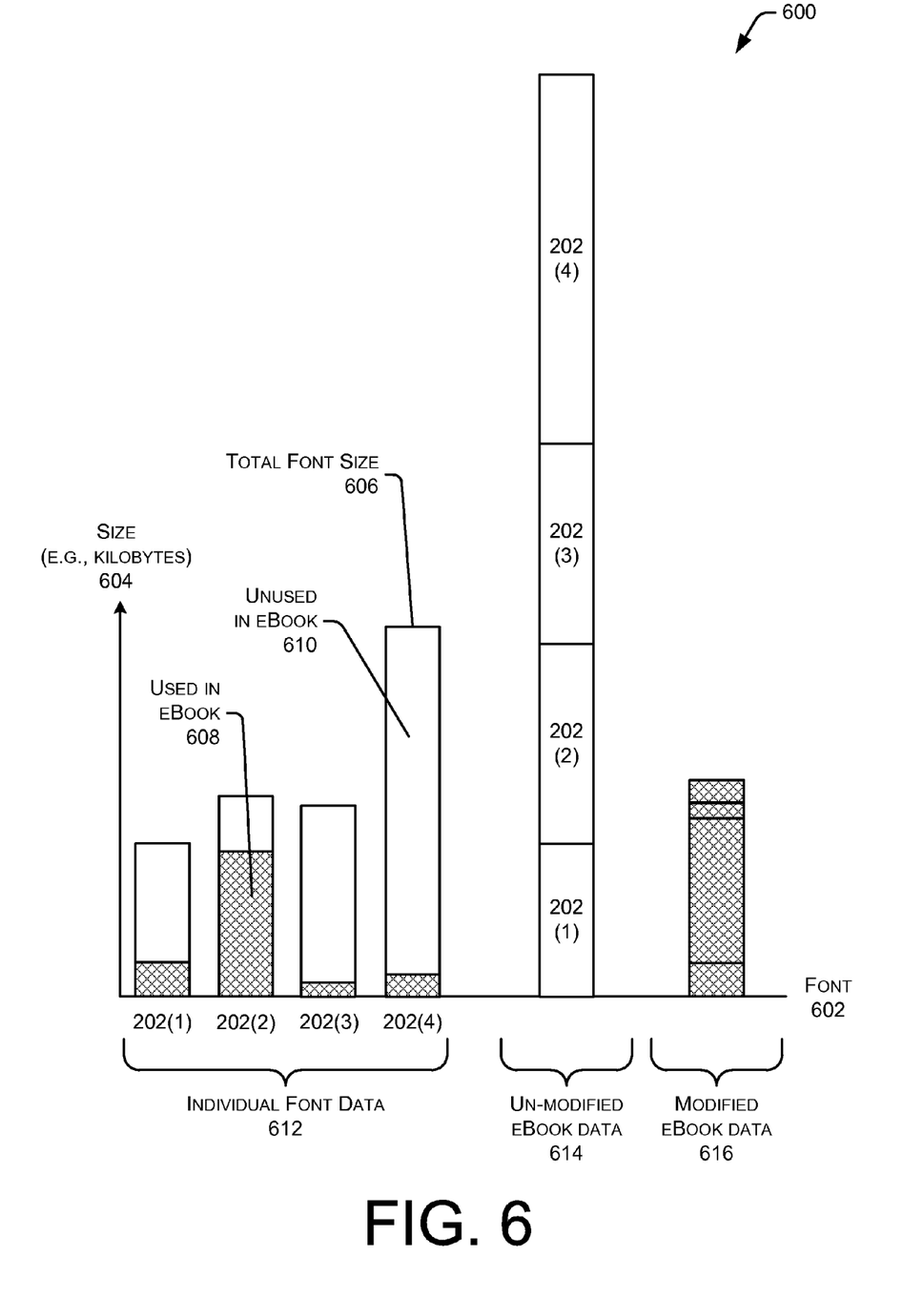
FIG. 6 is a chart illustrating relative data sizes of fonts and unmodified eBook data compared to modified eBook data in accordance with an embodiment of the disclosure.

FIG. 6 is a chart 600 illustrating relative data sizes of fonts and unmodified eBook data, such as the source eBook data 110, compared to the modified eBook data 114. Along a horizontal axis different fonts 602 are shown. Along a vertical axis a relative size 604 is depicted, while different fonts 602 are depicted along the horizontal axis. The relative size 604 may be considered to be the size of the font 202 as given in bytes, blocks, and so forth. Depicted on this chart are the fonts 202(1)-202(4). For each font, a total font size 606 is indicated. This is the size of the font 202 and associated data such as the character map, the glyph information, and so forth.

Also shown with crosshatch shading for each of the fonts 202 is a portion of the font 202 which is used in the eBook 608. As mentioned above, a font 202 may be considered in some implementations as being used when a frequency of occurrence of the font and glyphs associated therewith is greater than zero. Also shown is the relative size 604 of the font 202 which is unused in the eBook 610. In this chart, variations in the relative sizes used in the eBooks 608 are depicted. For example, the font 202(1), which is used for the chapter headings, has only a relatively small portion which is used, while the font 202(2), which is used for the body text in the eBook, is significantly used. The unused portion of the font 202(2) may be for characters and associated glyphs used by other languages. For example, where the font 202(2) comprises the roman character set, which includes Cyrillic and Greek characters, an eBook that does not utilize those characters would have no need for them and the associated glyphs.

The individual font data 612 for the fonts 202(1)-202(4) is shown compared to the unmodified eBook data 614. As described above, the traditional systems for eBook distribution may provide the entire fonts 202, with a correspondingly large file size. As shown here, the unmodified eBook data 614 combines all three fonts, and thus is very large relative to modified eBook data 616. The modified eBook data 616 has omitted the unused portions of the fonts 202(1)-202(4) and is significantly smaller than the unmodified eBook data 614 as employed in the modified eBook data 114. In this illustration, fonts present in the modified eBook data 616 when taken together are only slightly larger than the total font size 606 of the font 202(2). This reduction in size conveys significant advantages (particularly when the device 102 has memory constraints) when delivering the modified eBook data 114 over a relatively expensive or low-bandwidth network 106 connection, and so forth.

Figure 7:
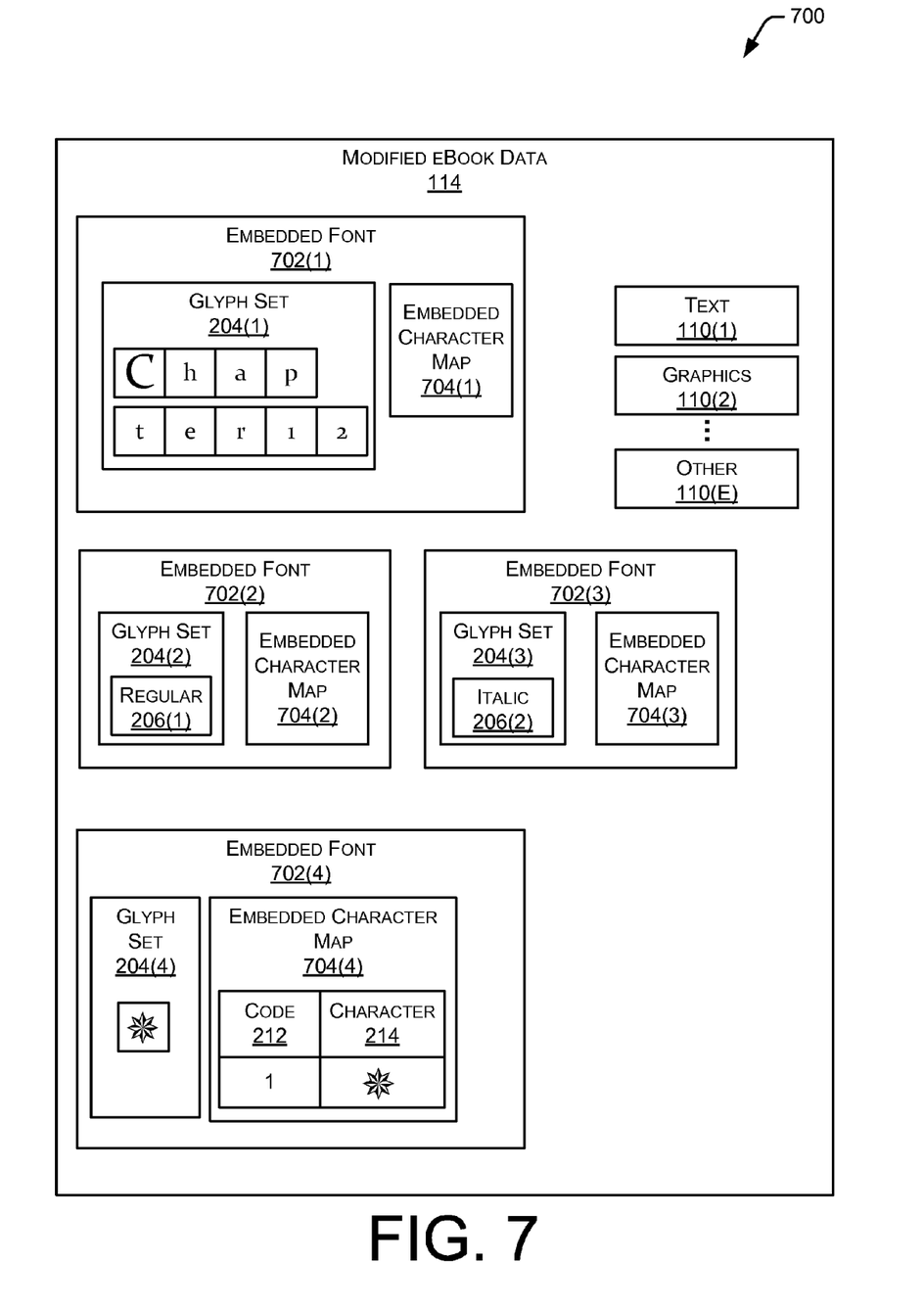
FIG. 7 illustrates a block diagram of modified eBook data in accordance with an embodiment of the disclosure.

FIG. 7 illustrates a block diagram 700 of the modified eBook data 114. As described above, the server 108 is configured to generate one or more embedded fonts 702. These embedded fonts 702 are based on the source fonts 202. A corresponding embedded character map 704 is provided for each of the embedded fonts 702. In some implementations, the embedded fonts 702 may be considered to be a subset of the source fonts 202. This subset may be configured such that the embedded fonts 702 include only glyphs that are designated for rendering the text content when presented on the display. For example, as shown here, the embedded font 702(1) is based on the source font 202(1). Because the source font 202(1) was determined by the analysis module 420 as only being used for the chapter headings, the embedded font 702(1) contains the glyphs for the characters used in the word "Chapter" and the numerals used to designate the chapters. Furthermore, because the eBook does not utilize the bold or italic forms, those have been omitted from the embedded font 702(1). This embedded font 702(1) is thus significantly smaller than the source font 202(1), as shown above with respect to FIG. 6.

The modified eBook data 114 shown here also includes the embedded font 702(2) which is based on the source font 202(2), used for the body text in the examples given herein. The glyphs 204(2) for the characters used with this font 202(2) in the eBook are provided in this embedded font 702(2). The boldface form has been omitted because it is not used in the presentation of this particular eBook. Characters and corresponding glyphs which are not used, such as Cyrillic or Greek, have also been omitted. Similarly, the embedded font 702(2) provides the glyphs of italic form used in this particular eBook. As shown above with regard to FIG. 6, this results in a reduction in the overall size of this embedded font 702(2).

The embedded font 702(4) corresponding to the source font 202(4) comprises a glyph set 214(3) of the single glyph of the eight pointed star as shown in FIG. 5. From the entire set of glyphs 214(3) available in the source font 202(4), this is the single glyph used in this eBook. As a result, the embedded font 702(4) comprises this single glyph, resulting in a significant reduction in the space required by the source font 202(4).

The modified eBook data 114 thus includes the text 110(1), any references or designations to the particular fonts which are now embedded fonts 702, the graphics 110(2), and other data 110(E).

Figure 8:
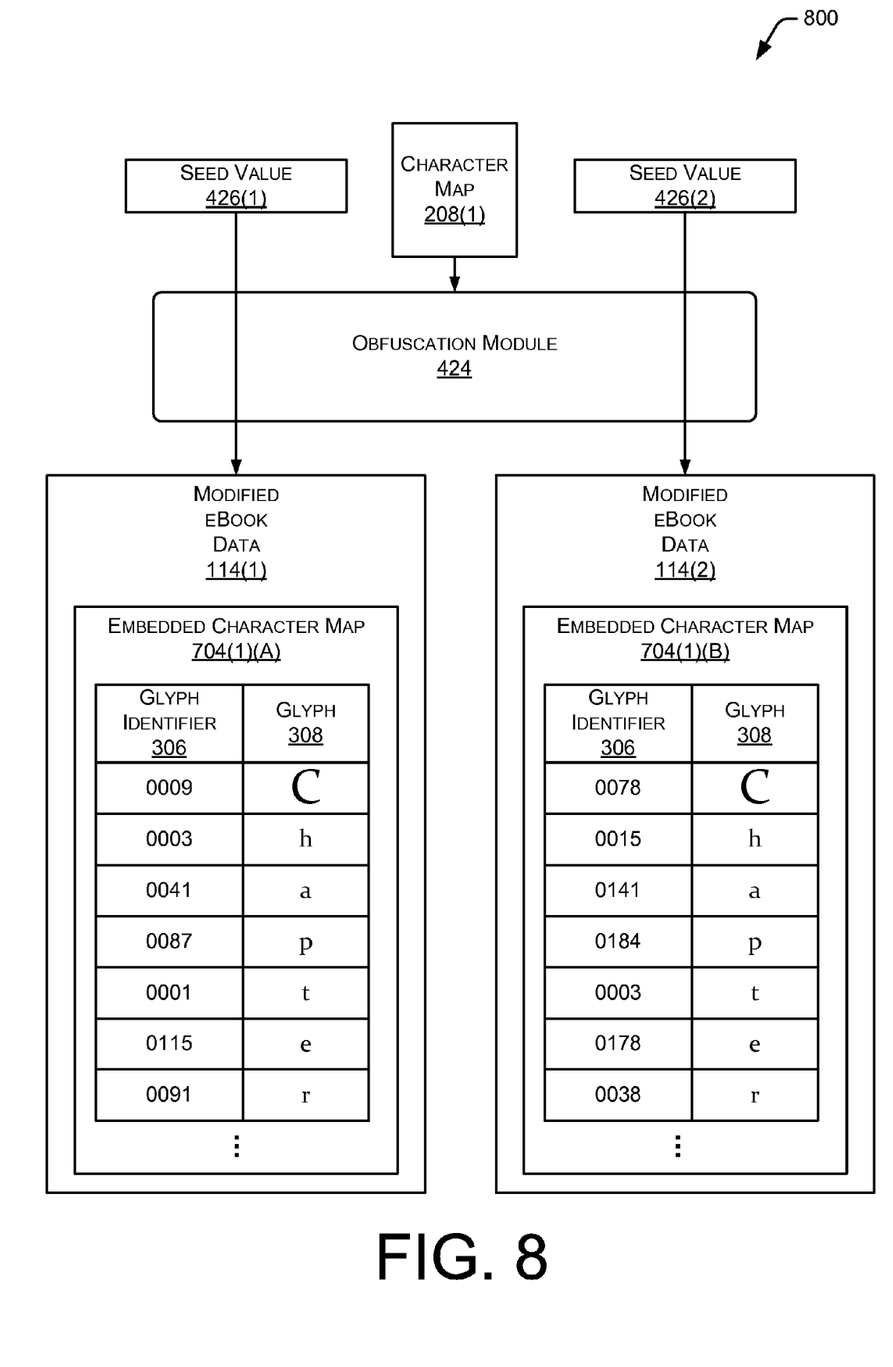
FIG. 8 illustrates embedded character maps as modified with seed values to obfuscate contents of the eBook in accordance with an embodiment of the disclosure.

FIG. 8 illustrates embedded character maps 800 as modified with seed values to obfuscate contents of the eBook. As described, in some implementations, obfuscation of the embedded character map 704 may be used to enhance security of the embedded font 702, the eBook text 110(1), or both.

As illustrated here, the obfuscation module 424 of the server 108 receives the source character map 208(1) associated with the source font 202(1). While the embedded character maps 704 are depicted with the glyph identifier 306 and the glyph 308, in other implementations, other data may be present such as corresponding character codes 302.

In this example, the source character map 208(1) associated with the source font 202(1) is provided to the obfuscation module 424. The obfuscation module 424 acquires or generates a seed value 426(1). This seed value 426(1) may be associated with one or more of the particular eBook, the device 102, the user 104, and so forth. The obfuscation module 424 applies a transform or other function to the relationship between the character code 302, the glyph identifier 306, the glyph 308, or a combination thereof.

After application of the seed value 426(1) by the obfuscation module 424, the embedded character map 704(1)(A) is generated which corresponds to the embedded font 702(1) and is incorporated into the modified eBook data 114(1). In this illustration, the embedded character map 704(1)(A) describes a relationship between the glyph identifier 306 and the glyph 308 for the embedded font 702(1). For example, glyph identifier 0009 refers to the capital "C" glyph as defined by the embedded font 702(1).

In comparison, a different seed value 426(2) has been applied to the same character map 208(1) associated with the same source eBook data 110 as used to generate the modified eBook data 114(1). However, a different seed value 426(2) is used by the obfuscation module 424 resulting in the modified eBook data 114(2) having an embedded character map 704(1)(B) which differs from the embedded character map 704(1)(A). For example, in the embedded character map 704(1)(B), the glyph identifier 0078 corresponds to the capital "C" glyph defined by the embedded font 702(1).

In some implementations, additional characters and glyphs not otherwise present in the corresponding source font 202 may be included in the embedded font 702, the embedded character map 704, or both to further obfuscate content. For example, a few Cyrillic characters from the font 202(2) may be inserted into the embedded font 702(1) for otherwise entirely English text 110(1) which is based on the font 202(1) and the corresponding embedded character map 704(1) to further obfuscate the data. Thus, the embedded font 702 includes one or more glyphs from another or different source font 202.

Thus, by using the obfuscation module 424 and different seed values, security of the source font 202, corresponding embedded font 702, and the text of the eBook is improved. Furthermore, the differences between the embedded character maps 704 as created by the obfuscation module 424 may be used to encode information or provide watermarking features.

Illustrative Process

Figure 9:
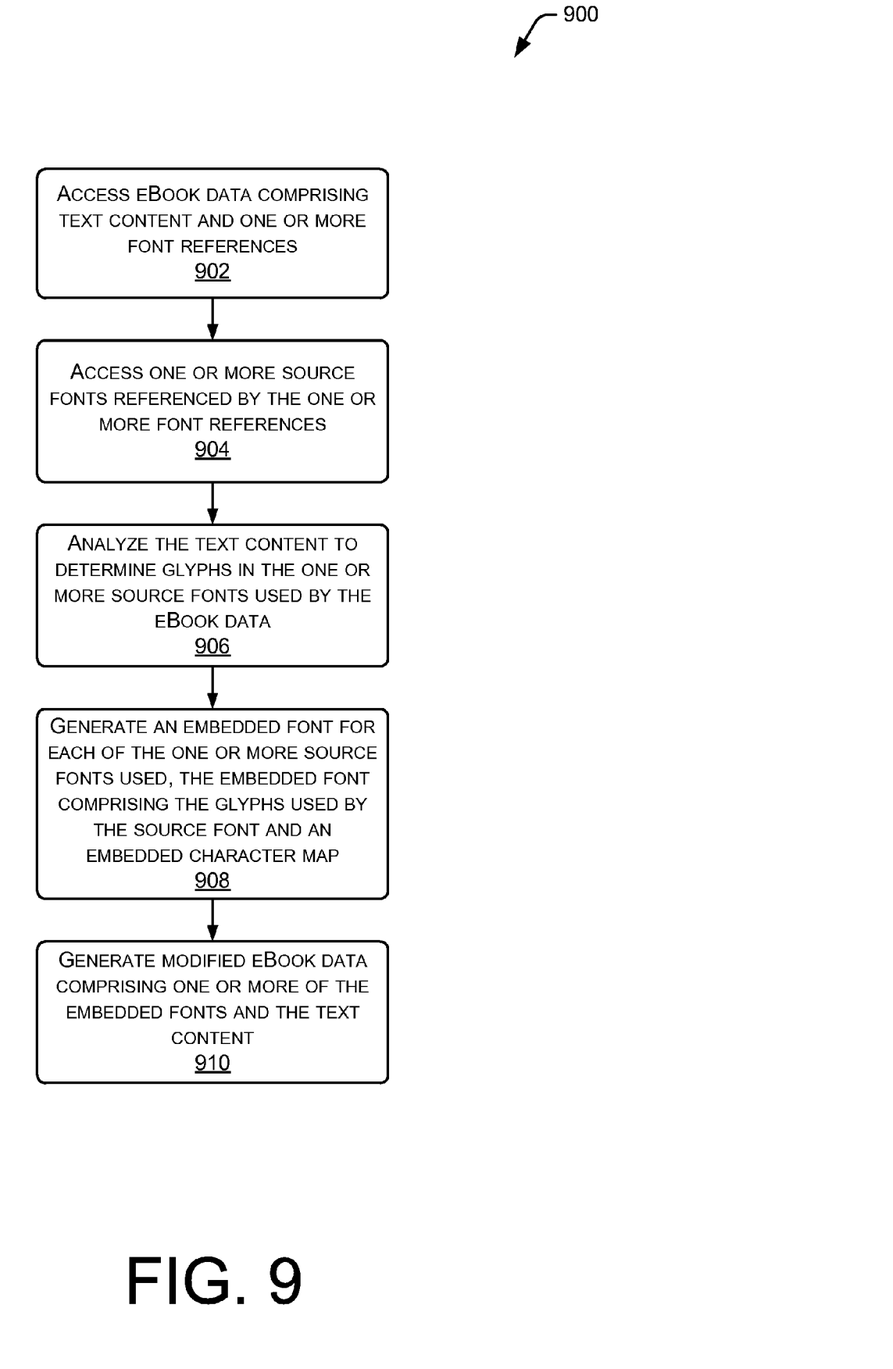
FIG. 9 illustrates a flow diagram of a process of generating modified eBook data in accordance with an embodiment of the disclosure.

FIG. 9 illustrates a flow diagram 900 of a process of generating the modified eBook data 114. The process may be implemented by the server 108 and the modules therein.

Block 902 accesses source eBook data 110 comprising text content 110(1) and one or more font references to one or more source fonts. The source fonts comprise glyphs used during rendering the text content 110(1) on a display, such as the display of the device 102. In some implementations, the access may comprise the pack/unpack module 418 unpacking the source eBook data 110. During unpacking, the module 418 accesses and prepares the source eBook data 110 for further processing. The unpacking may comprise decompressing, retrieving the font data 112 associated with the text 110(1), deconstructing elements of a container object, and so forth.

Block 904 accesses one or more source fonts 202 referenced by the one or more font references in the font data 112 associated with the source eBook data 110. For example, when the source eBook data 110 has font data 112 indicating that fonts 202(1)-202(4) are used, these fonts may be accessed.

The text content 110(1) may comprise a markup language, such as, hypertext markup language ("HTML"). The one or more font references in the text content 110(1) may comprise entries in a markup language designating a particular source font for use in rendering text. Continuing the example, HTML tags may be used to designate which portions of the text content 110(1) are to be rendered with a particular source font 202.

Block 906 analyzes characters of the text content 110(1) to determine glyphs in the one or more source fonts used by the eBook data. In some implementations, the analysis of text content 110(1) may comprise generating a frequency distribution of the characters or glyphs used for one or more of the source fonts. For example, font 202(1) used for the chapter headings of the eBook may show a frequency distribution of zero for the letter "Q" because it is unused in the font of this particular eBook. A glyph or character is deemed to be used when a frequency of occurrence in the text content 110(1) is greater than zero. Glyphs which are designated for rendering thus have a frequency of greater than zero while glyphs non-designated for rendering exhibit a frequency of zero.

Block 908 generates from the accessed one or more source fonts 202 an embedded font 702 for one or more of the source fonts. As described above, the embedded font 702 comprises the glyphs determined to be used by the source font and an embedded character map 704. For example, where the fonts 202(1)-202(4) are used, corresponding embedded fonts 702(1)-702(4) are generated each with embedded character maps 704(1)-704(4). As described above, the embedded font 702 may comprise a subset of the source font 202. For example, the embedded font 702 may omit glyphs which are non-designated for rendering as described above. The embedded character map may associate each glyph with data indicative of a corresponding character code of a respective source font.

In some implementations, the embedded character map 704 may be obfuscated as described above by the obfuscation module 424. The text content 110(1) may be modified from a first character map, such as the source character map 208, to a second character map such as the embedded character map 704. As a result of this obfuscation, a mapping between the embedded character map 704 for the embedded font 702 differs from a mapping in a source character map 208 of the source font 202.

Block 910 generates the modified eBook data 114 comprising the text content 110(1) and one or more of the embedded fonts 702. In some implementations, the modified eBook data 114 may be configured for presentation on an electrophoretic or other reflective display of the device 102.

In some implementations, the modified eBook data 114, which may comprise the text content and one or more of the embedded fonts 702, may be stored, such as in the datastore 414 or other storage accessible to the server 108. Once stored, the modified eBook data 114 may be distributed by the eBook distribution module 428 to the devices 102. As described above, to obfuscate the data, in some implementations, the characters in the stored text content may be encoded using glyph identifiers.

Prior to storage, the modified eBook data 114 may be packed by the pack/unpack module 418. During packing, the module 418 assembles the processed data such as embedded fonts 702 and embedded character maps 704 and prepares them for distribution. Packing may comprise assembling the processed data into a single container object, applying data compression, applying digital rights management, and so forth.

Figure 10:
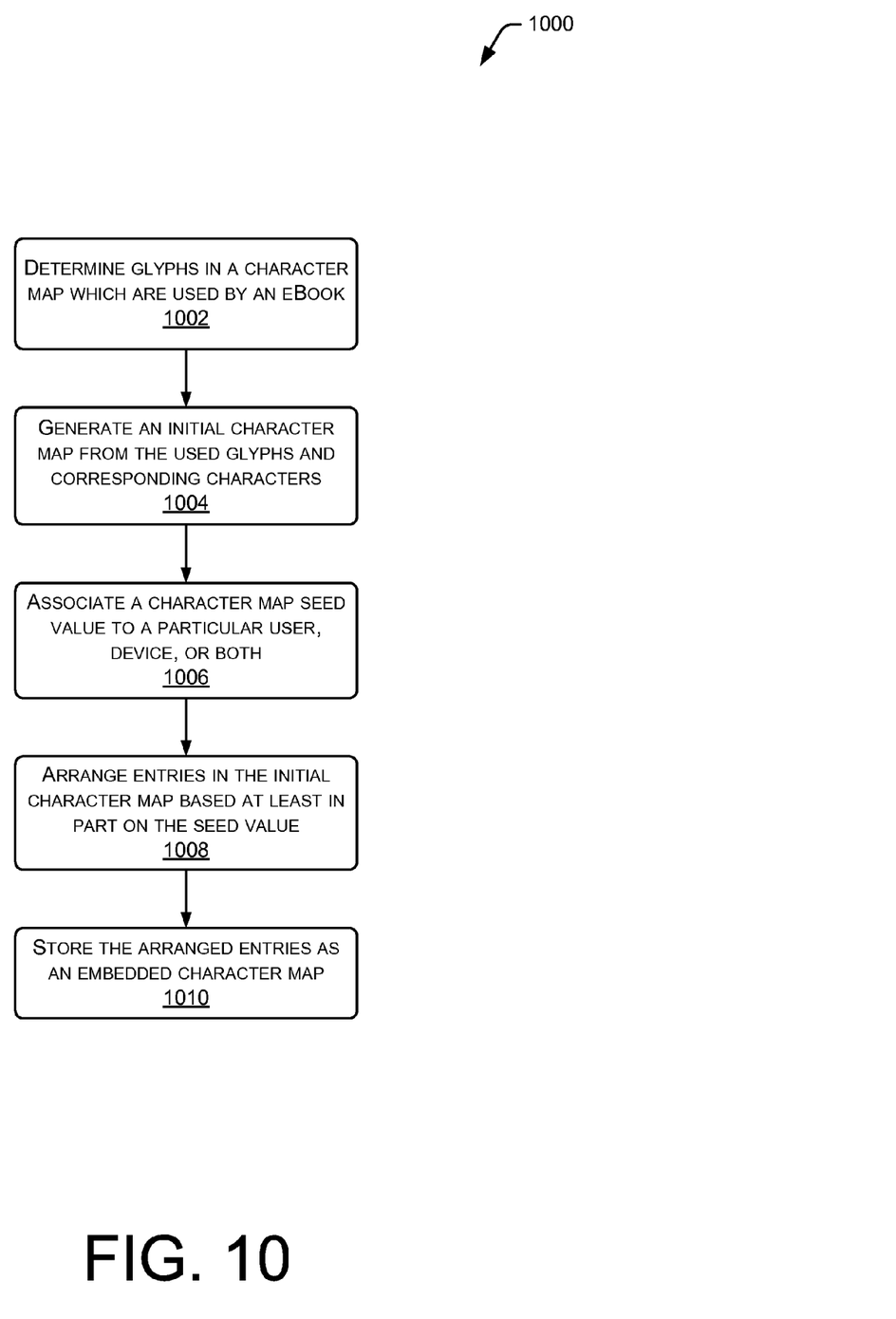
FIG. 10 illustrates a flow diagram of a process of generating an embedded character map in accordance with an embodiment of the disclosure.

FIG. 10 illustrates a flow diagram 1000 of a process of generating an embedded character map in accordance with an embodiment of the disclosure. The intake module 416 may perform the following functions.

Block 1002 determines the glyphs in a character map 208 which are used by the source eBook data 110. For example, the glyphs which are designated for presentation on the display of the device 102.

Block 1004 generates or accesses an initial character map from the glyphs used by the text content 110(1). Block 1006 associates a character map seed value 426 to the initial character map. This association may be based at least in part on one or more of a particular eBook, a particular user, or a particular reader device.

Block 1008 arranges or modifies entries in the initial character map based at least in part on the seed value 426. For example, the sequence of the entries may be rearranged based on the seed value 426, or the values of the glyph identifier may be modified based at least in part on the seed value 426. As described above, this may serve to obfuscate the contents of the modified eBook data 114.

Block 1010 stores the arranged entries as the embedded character map 704. For example, the embedded character map 704 may be stored in the datastore 414.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising:
   at least one memory storing computer-executable instructions; and
   at least one processor configured to access the at least one memory and execute the computer-executable instructions to:
      access eBook data comprising text content and a font reference to a source font, the text content comprising a character and the source font comprising a set of glyphs comprising a first glyph representing a first instance of the character and a second glyph representing a second instance of the character;
      analyze the text content to generate a first frequency distribution for the first glyph and a second frequency distribution for the second glyph based at least in part on a number of occurrences of the first instance of the character and the second instance of the character;
      determine that the first frequency distribution is 1 occurrence in the text content;
      determine that the second frequency distribution is greater than 1 occurrence in the text content;
      generate an embedded font comprising:
         the second glyph associated with the second instance of the character of the text content; and
         an embedded character map that associates the first instance of the character represented in the eBook with the second glyph and the second instance of the character with the second glyph; and
      generate modified eBook data comprising the text content and the embedded font.

2. The system of claim 1, wherein the embedded font comprises a subset of the source font.

3. The system of claim 1, wherein the font reference in the eBook data comprising entries in a markup language designating the source font for use in rendering text.

4. The system of claim 1, wherein the at least one processor is further configured to execute the computer-executable instructions to modify the text content from referring to a first character map to referring to a second character map.

5. The system of claim 1, wherein the embedded character map for the embedded font is based at least in part upon a character map seed value associated with at least one of the user or the reader device.

6. The system of claim 1, wherein the embedded character map associates the second glyph with a respective character code of the source font, and the embedded character map differs from a mapping in a source character map of the source font based at least in part on an identification of at least one of the user or the reader device.

7. One or more non-transitory computer-readable media storing computer-executable instructions that, when executed by at least one processor, configure the at least one processor to perform operations comprising:
   accessing data comprising text content using one or more source fonts, the one or more source fonts comprising a set of glyphs comprising a first glyph representing a first instance of the character and a second glyph representing a second instance of the character;
   determining that a first frequency distribution for the first glyph is less than a threshold number of occurrences in the text content;
   determining that a second frequency distribution for the second glyph meets the threshold number of occurrences in the text content;
   generating an embedded font based at least in part on the first frequency distribution and the second frequency distribution, the embedded font comprising the second glyph;
   generating an embedded character map for the embedded font, the embedded character map associating the first instance of the character with the second glyph and the second instance of the character with the second glyph; and
   storing the text content and the embedded font for distribution.

8. The one or more non-transitory computer-readable media of claim 7, wherein generating the embedded font comprises analyzing the text content and the one or more source fonts of the data.

9. The one or more non-transitory computer-readable media of claim 7, wherein the text content comprises a markup language.

10. The one or more non-transitory computer-readable media of claim 7, the at least one processor further configured to perform the operations comprising encoding characters in the text content with glyph identifiers.

11. The one or more non-transitory computer-readable media of claim 7, the generating the embedded character map for the embedded font further comprising computer-executable instructions that configure the at least one processor to perform operations comprising:
 generating an initial character map from the glyphs used by the text content;
 associating a character map seed value to one or more of the user or the reader device;
 arranging entries in the initial character map based at least in part on the seed value; and
 storing the arranged entries as the embedded character map.

12. The one or more non-transitory computer-readable media of claim 11, the at least one processor further configured to perform the operation comprising sending the embedded font to the reader device associated with the character map seed value.

13. One or more non-transitory computer-readable media storing computer-executable instructions that, when executed by at least one processor, configure the at least one processor to perform operations comprising:
 accessing electronic book data comprising text content and at least one source font, the at least one source font comprising a set of glyphs comprising a first glyph representing a first instance of the character and a second glyph representing a second instance of the character;
 determining that a first frequency distribution for the first glyph is less than a threshold number of occurrences in the text content;
 determining that a second frequency distribution for the second glyph meets the threshold number of occurrences in the text content;
 generating an embedded font based at least in part on the first frequency distribution and the second frequency distribution, the embedded font comprising the second glyph; and
 generating an embedded character map that associates the first instance of the character with the second glyph and the second instance of the character with the second glyph.

14. The one or more non-transitory computer-readable media of claim 13, wherein the embedded font includes only glyphs that are designated for rendering the text content when presented on the display.

15. The one or more non-transitory computer-readable media of claim 13, wherein the embedded font includes one or more glyphs from a source font other than a source font of the at least one source font associated with the corresponding glyphs.

16. The one or more non-transitory computer-readable media of claim 13, the at least one processor further configured to execute the computer-executable instructions to perform the operation comprising generating a distribution package comprising the text content, one or more embedded fonts, and one or more embedded character maps.

17. The one or more non-transitory computer-readable media of claim 13, wherein the text content comprises a markup language.

18. The one or more non-transitory computer-readable media of claim 13, wherein the computer-executable instructions for generating the embedded character map for the embedded font further comprises computer-executable instructions that configure the at least one processor to perform the operations comprising:
 generating an initial character map based at least in part on characters appearing at least once in the text;
 accessing a character map seed value;
 modifying entries in the initial character map based at least in part on the seed value; and
 storing the arranged entries as the embedded character map.

19. The one or more non-transitory computer-readable media of claim 18, wherein the seed value is configured to differ based on one or more of a device identifier, a user identifier, or an electronic book identifier.

20. The one or more non-transitory computer-readable media of claim 18, wherein the computer-executable instructions for the modifying further comprises computer-executable instructions that configure the at least one processor to perform operations comprising applying a transform to an index of the initial character map.

* * * * *